(12) United States Patent
Rossmann (10) Patent No.: US 7,788,240 B2
(45) Date of Patent: Aug. 31, 2010

(54) HASH MAPPING WITH SECONDARY TABLE HAVING LINEAR PROBING

(75) Inventor: Albert P. Rossmann, Wiesloch (DE)

(73) Assignee: SAP AG, Walldorf (DE)

( * ) Notice: Subject to any disclaimer, the term of this patent is extended or adjusted under 35 U.S.C. 154(b) by 214 days.

(21) Appl. No.: 11/026,357

(22) Filed: Dec. 29, 2004

(65) Prior Publication Data

US 2006/0143168 A1    Jun. 29, 2006

(51) Int. Cl.
    G06F 7/00    (2006.01)
    G06F 17/00   (2006.01)
(52) U.S. Cl. .................................. 707/698; 711/216
(58) Field of Classification Search ........................ None
    See application file for complete search history.

(56) References Cited

U.S. PATENT DOCUMENTS

| | | | |
|---|---|---|---|
| 5,287,499 A * | 2/1994 | Nemes | 707/2 |
| 5,530,958 A * | 6/1996 | Agarwal et al. | 711/3 |
| 5,542,087 A * | 7/1996 | Neimat et al. | 707/10 |
| 5,544,340 A | 8/1996 | Doi et al. | |
| 5,619,676 A | 4/1997 | Fukuda et al. | |
| 5,796,977 A | 8/1998 | Sarangdhar et al. | |
| 5,812,418 A | 9/1998 | Lattimore et al. | |
| 6,097,725 A * | 8/2000 | Glaise et al. | 370/395.32 |
| 6,374,250 B2 * | 4/2002 | Ajtai et al. | 707/101 |
| 6,412,038 B1 | 6/2002 | Mehale | |
| 6,487,641 B1 | 11/2002 | Cusson et al. | |
| 6,549,987 B1 | 4/2003 | Rappoport et al. | |
| 6,675,265 B2 | 1/2004 | Barroso et al. | |
| 6,683,523 B2 | 1/2004 | Takashima et al. | |
| 7,051,164 B2 | 5/2006 | Smith | |
| 7,096,323 B1 | 8/2006 | Conway et al. | |
| 2002/0010702 A1 * | 1/2002 | Ajtai et al. | 707/101 |
| 2003/0163643 A1 | 8/2003 | Riedlinger et al. | |
| 2004/0123046 A1 | 6/2004 | Hum et al. | |
| 2006/0041715 A1 | 2/2006 | Chrysos et al. | |
| 2006/0143384 A1 | 6/2006 | Hughes et al. | |

FOREIGN PATENT DOCUMENTS

| | | |
|---|---|---|
| EP | 689141 A2 | 12/1995 |
| EP | 905628 A2 | 3/1999 |
| WO | WO 03088048 A1 | 10/2003 |

OTHER PUBLICATIONS

Publication "Prefix Hash Tree An Indexing Data Structure Over Distributed Hash Tables", Annual ACM Symposium on Principles of Distributed Computing: Proceedings of the twenty-third annual ACM symposium on Principles of distributed computing , p. 25-28, Jul. 2004 by Sriram et al.*

(Continued)

Primary Examiner—Etienne P LeRoux
Assistant Examiner—Susan Y Chen
(74) Attorney, Agent, or Firm—Blakely Sokoloff Taylor & Zafman LLP (57) ABSTRACT

A method is described that involves hashing a key value to locate a slot in a primary table, then, hashing the key value to locate a first slot in a secondary table, then, linearly probing the secondary table starting from the first slot.

24 Claims, 11 Drawing Sheets

OTHER PUBLICATIONS

Morris, J., "Data Structures and Algorithms: Hash Tables", pp. 1-5, 1998, http://ciips.ee.uwa.edu.au/~morris/Year2/PLDS210/hash_tables.html.

Author(s), "collision resolution scheme", from *Dictionary of Algorithms and Data Structures*, Paul E. Black, ed., *NIST*, Dec. 1, 2004, p. 1, http://www.nist.gov/dads/HTML/collisionres.html.

Author(s), "open addressing", from *Dictionary of Algorithms and Data Structures*, Paul E. Black, ed., *NIST*, Dec. 17, 2004, p. 1, http://www.nist.gov/dads/HTML/openaddress.html.

Authors(s), "linear probing", from *Dictionary of Algorithms and Data Structues*, Paul E. Black, ed., *NIST*, Dec. 17, 2004, p. 1, http://www.nist.gov/dads/HTML/linearprobng.html.

Author(s), "double hashing", from *Dictionary of Algorithms and Data Structures*, Paul E. Black, ed., *NIST*, Dec. 17, 2004, p. 1, http://www.nist.gov/dads/HTML/doublehashng.html.

Author(s), "quadratic probing", from *Dictionary of Algorithms and Data Structures*, Paul E. Black, ed., *NIST*, Dec. 17, 2004, p. 1, http://www.nist.gov/dads/HTML/quadraticprb.html.

Author(s), "chaining", from *Dictionary of Algorithms and Data Structures*, Paul E. Black, ed., *NIST*, Dec. 17, 2004, p. 1, http://www.nist.gov/dads/HTML/chaining.html.

Author(s), "coalesced chaining", from *Dictionary of Algorithms and Data Structures*, Paul E. Black, ed., *NIST*, Dec. 17, 2004, p. 1, http://www.nist.gov/dads/HTML/coalescdhash.html.

Author(s), "separate chaining", from *Dictionary of Algorithms and Data Structures*, Paul E. Black, ed., *NIST*, Dec. 17, 2004, pp. 1-2, http://www.nist.gov/dads/HTML/separatchain.html.

Present Application, U.S. Appl. No. 11/026,357, filed Dec. 29, 2004, "Hash Mapping With Secondary Table Having Linear Probing", p. 2, [0002] through p. 5 [0010].

Kim, et al., "An Adaptive, Non-Uniform Cache Structure for Wire-Delay Dominated On-Chip Caches", Computer Architecture and Technology Laboratory, proceedings of the 10th international conference on architectural support for programming languages and operating systems, 2002, pp. 211-222.

* cited by examiner

HASH MAPPING WITH SECONDARY TABLE HAVING LINEAR PROBING

FIELD OF THE INVENTION

The field of invention relates generally to hash mapping; and, more specifically, to hash mapping with a secondary table having linear probing.

BACKGROUND

Figure 1A:
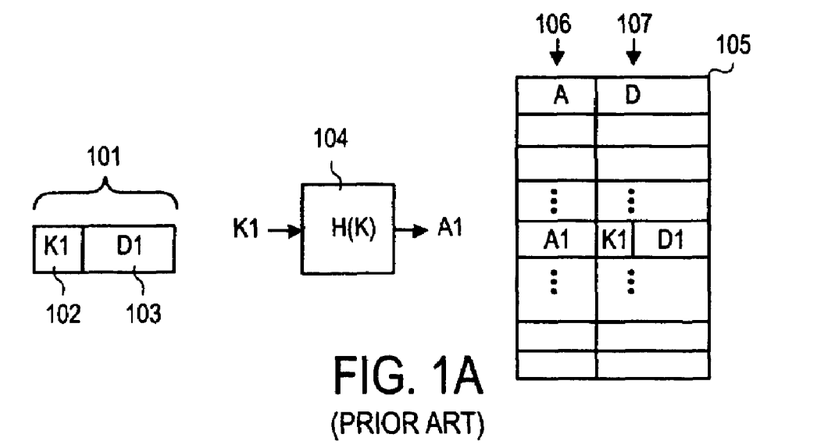
FIG. 1a (prior art) shows a simple hash map.

A cache is often implemented with a hash map. FIG. 1a shows a traditional hash map implementation. Typically, a software routine uses various items of data over the course of its execution. Each item of data that may be stored in the cache is assigned a unique "key". FIG. 1a shows a depiction of such an construction in which a key K1 102 and item of data D1 103 are appended together as a data structure 101. The key K1 is used to search for the item of data D1 in the cache.

Because the key K1 can be a random value and because the cache's resources are tied to memory having 105 a range of addressing space 106 and corresponding data space 107, the various keys associated with the various items of data must be able to "map" to the cache's addressing space 106. A hash function 104 is used to perform this mapping. According to the depiction of FIG. 1a, the hashing function 104 produces address value A1 in response to an input key value K1.

Thus, in order to store the data D1 in cache, its key K1 is provided to a hashing function 104. The hashing function 104 produces the appropriate address A1. The data structure containing the key K1 and the data D1 are then stored in the memory resources used to implement the cache (hereinafter referred to as a "table" 105 or "hash table" 105) at the A1 address.

Figure 1B:
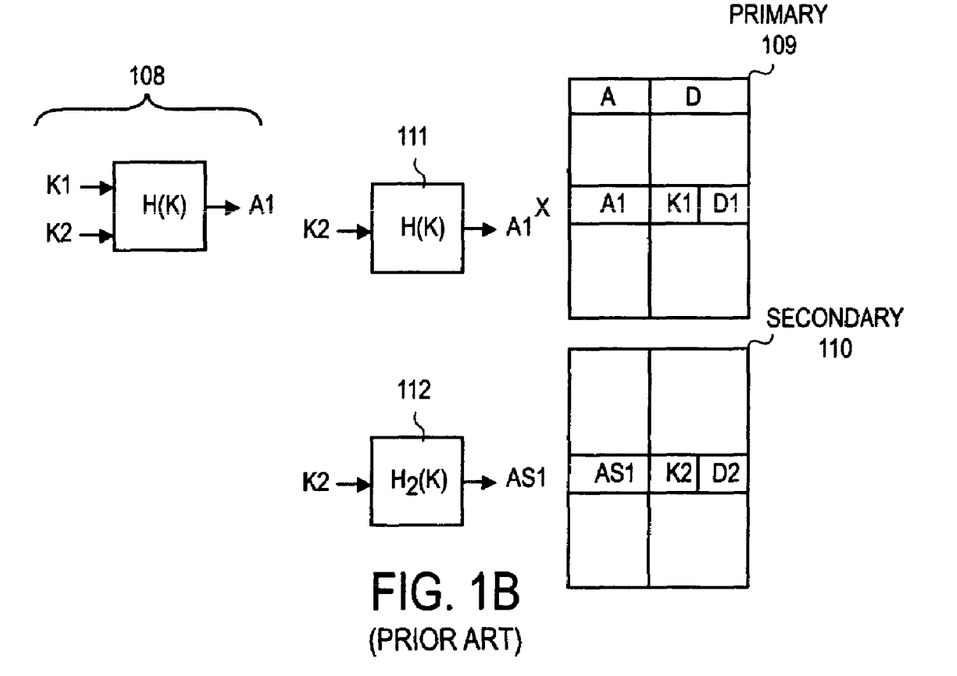
FIG. 1b (prior art) shows a hash map implemented with primary and secondary tables.

Frequently the number of separate items of data which "could be" stored in the hash table 105 is much greater than the size of the hash table's addressing space 106. The mathematical behavior of the hashing function 104 is such that different key values can map to the same hash table address. For example, as depicted in FIG. 1b both of key values K1 and K2 map to the same address value A1 108. Various hash mapping techniques have been developed to handle the situation where different key values map to the same hashing function output value.

FIG. 1b shows a first approach that involves multiple hash tables. When a "collision" occurs, that is, when an attempt is made to store a second data structure that maps to a table location (also referred to as a "slot") where a first data structure already resides (because the key values K1, K2 for the pair of data structures map to the same table address A1 and the first data structure was stored into the hash table before the second), the second data structure is stored into a next, "deeper" hash table. Here, the first table that is looked to is referred to the primary table 109 and the second table that is looked to is referred to as the secondary table 110.

As an example, consider the situation depicted in FIG. 1b in which an attempt is made to store a second data structure having key K2 into a cache at a moment in time when a first data structure having a key K1 is already located in the primary table 109 of the cache at the address A1 that both key K1 and key K2 map to. In attempting to store the second data structure, its key K2 is hashed by the hashing function 111 to produce the corresponding address A1. The primary table 109 is looked to first. As such, the slot at address A1 of the primary table 109 is accessed first. When it is discovered by way of this access that the A1 slot in the primary table 109 is already populated with the first data structure (having key K1), a re-hash operation is performed with a second hashing function 112.

The value produced by the second hashing function 112 produces a second address value AS1 from the K2 key that is to be used for accessing the secondary table 110. According to this example, the AS1 slot is empty and the second data structure is therefore stored in the AS1 slot of the secondary table 110. Depending on implementation, hash functions 111 and 112 may be the same hashing function or may be different hashing functions. Reading/writing a data structure from/to the primary table 109 should consume less time than the reading/writing a data structure from/to the secondary table 110 because at least an additional table access operation is performed if not an additional hash function operation.

Figure 1C:
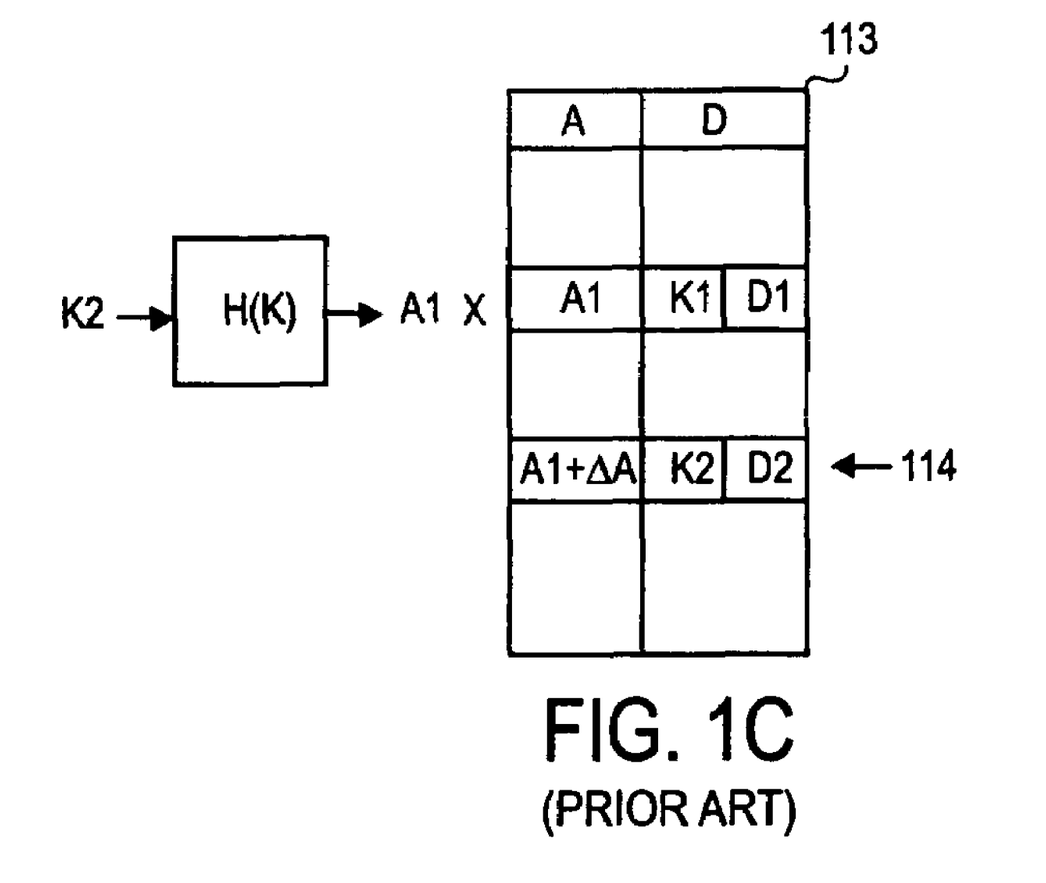
FIG. 1c (prior art) shows a hash map implemented with linear probing.

FIG. 1c shows another technique referred to as linear probing. According to the linear probing technique, rather than use a secondary table, when a collision occurs, an offset $\Delta A$ is summed with the address A1 produced by the hashing function to produce a second slot address A1+$\Delta A$ in the hash table 113 where the data structure that seeks to be inserted into the table 113 can be placed.

According to the exemplary depiction of FIG. 1c, when an attempt is made to insert a second data structure having key K2 into the hash table 113, a hash on the K2 value is performed which generates the address A1. When the A1 slot is accessed it is realized that a first data structure (having key K1 and data D1) is already stored there. As such, the offset $\Delta A$ is summed with the A1 address to produce a next address of A1+$\Delta A$. When the A1+$\Delta A$ address value is access it is found to be empty and the second data structure is stored there 114.

SUMMARY

A method is described that involves hashing a key value to locate a slot in a primary table, then, hashing the key value to locate a first slot in a secondary table, then, linearly probing the secondary table starting from the first slot.

FIGURES

The present invention is illustrated by way of example and not limitation in the figures of the accompanying drawings, in which like references indicate similar elements and in which.

DETAILED DESCRIPTION

Figure 2:
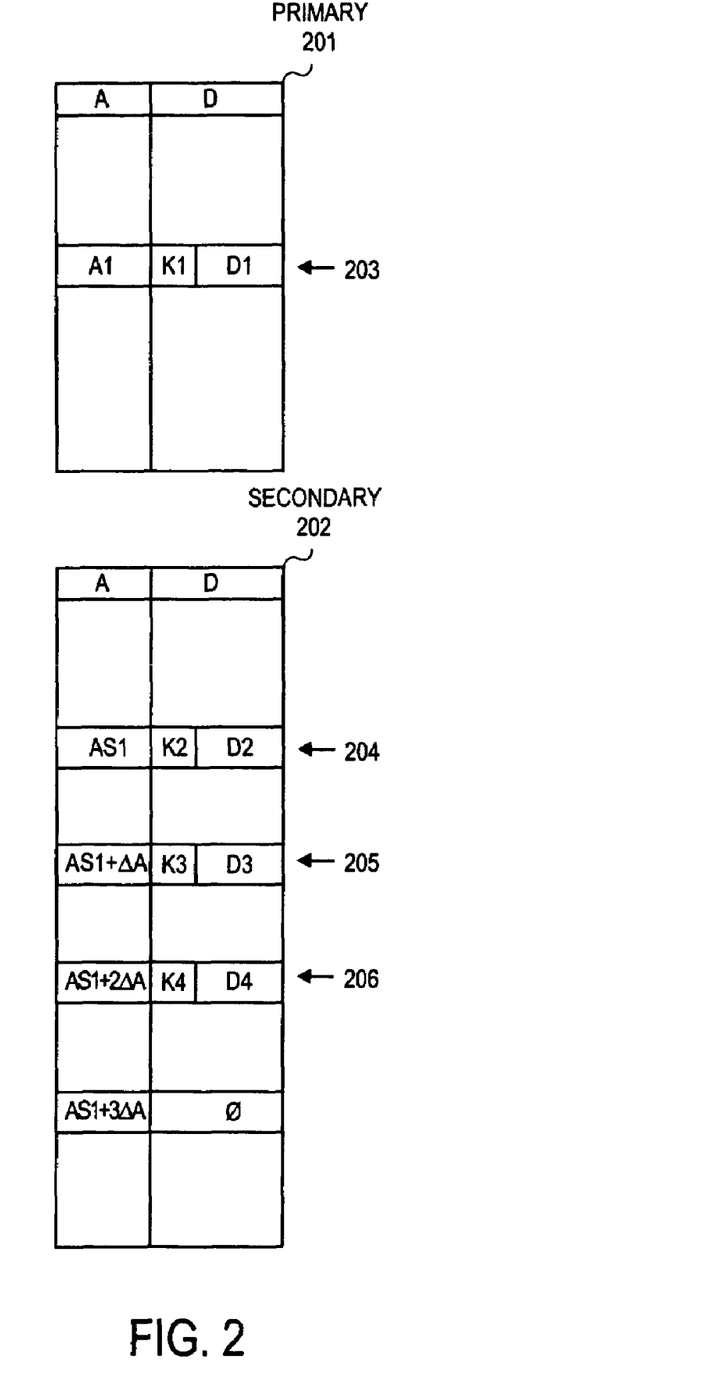
FIG. 2 shows a hash map having a secondary table with linear probing.
Figure 3:
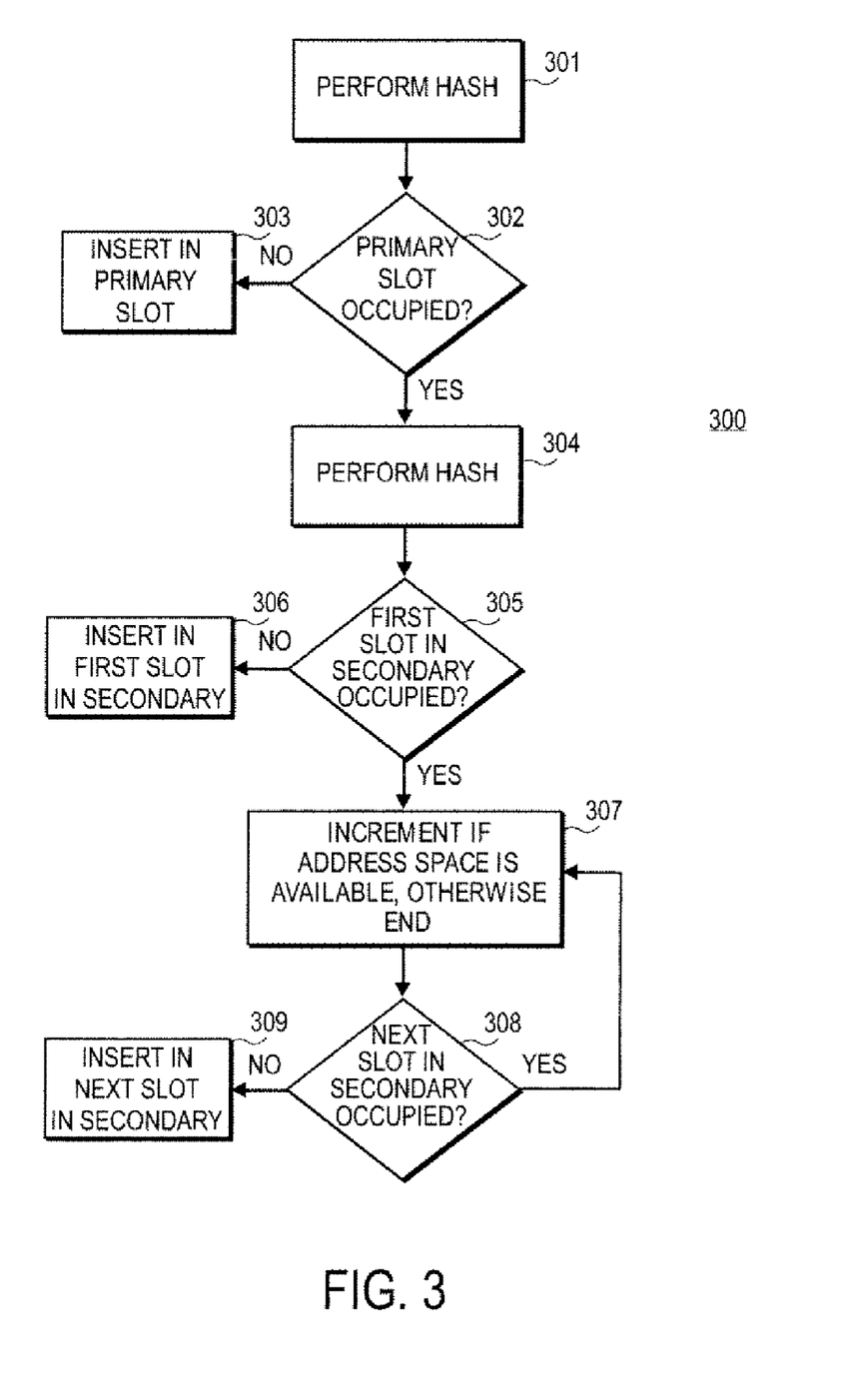
FIG. 3 shows a basic insertion process that can produce the population observed in FIG. 2.

FIG. 2 shows a hash mapping architecture having primary 201 and secondary 202 tables. According to the hash mapping approach of FIG. 2, the secondary table 202 uses linear probing to resolve any further collisions that may result from third and higher order data structures that map to the same hashing function output. FIG. 3 show a basic insertion process that helps demonstrate the characteristics of the hash mapping table of FIG. 2. As an example, the insertion of key values K1, K2, K3 and K4 in order will be described with reference to FIGS. 2 and 3 where key values K1, K2, K3 and K4 map to the same hashing function output value.

Referring to FIGS. 2 and 3, when the data structure with key value K1 is to be inserted into the hash table a hashing function is first performed 301 to produce a primary table 201 address value A1. Assuming as an initial condition that the entire hash map is empty, the A1 slot of the primary table 201 will not be occupied with any other data structure 302. As such, the first data structure will be inserted into the A1 slot of the primary table 303.

When the data structure with key value K2 is to be inserted into the hash table a hashing function is first performed 301 to produce a primary table 201 address value A1. Because of the prior insertion of the first data structure into the A1 slot of the primary table, a collision occurs at the primary table 201 (i.e., the answer to inquiry 302 is "yes"). According to the particular embodiment being described herein, a second hash function is performed 304 on the K2 key to identify the first slot AS1 in the secondary table 201 that the K2 key maps to. Again, assuming the entire secondary table 202 is empty, the AS1 slot of the secondary table 201 will not be occupied with any other data structure 305. As such, the second data structure will be inserted into the AS1 slot of the primary table 306.

When the data structure with key value K3 is to be inserted into the hash table a hashing function is first performed 301 to produce a primary table 201 address value A1. Because of the prior insertion of the first data structure into the A1 slot of the primary table, a collision occurs at the primary table 201 (i.e., the answer to inquiry 302 is "yes"). A second hash function is performed 304 on the K3 key to identify the first slot AS1 in the secondary table 201 that the K3 key maps to. Because of the prior insertion of the second data structure into the AS1 slot of the secondary table 202, a collision occurs at the first slot in the secondary table 202 (i.e., the answer to inquiry 305 is "yes").

As such, consistent with a linear probing scheme, the AS1 value is summed 307 with a fixed value $\Delta A$ to identify a next secondary slot AS1+$\Delta A$ within the secondary table 202 where the third data structure can be entered. According to the specific embodiment observed in FIG. 3, the summation 307 is an "increment" which means secondary table address values increase with each collision. It should be understood that the term summation also includes techniques where the added offset is negative resulting in a "decrement" that causes secondary table address values to decrease with each collision. After the increment 307, the newly identified AS1+$\Delta A$ slot will be empty 308 and the third data structure will be stored there 309.

The process for the fourth data structure having the K4 key value will be the same as described above for the third data structure, except that the AS1+$\Delta A$ slot of the secondary table 202 will be occupied by the third data structure (i.e., the answer to the initial inquiry 308 will be "yes"). As such, again consistent with a linear probing scheme, another $\Delta A$ offset will be added 307 to the AS1+$\Delta A$ slot value producing a next slot address of AS1+2$\Delta A$. The entry at the AS1+2$\Delta A$ slot will be empty 308 resulting in the insertion of the fourth data structure into the AS1+2$\Delta A$ slot.

According to the technique described herein, no flag or other identifier needs to be written into the third or fourth data structure to indicate the end of the K1-K2-K3-K4 "chain" of stored data structures. This is so because, according to the scheme being described, the next secondary table "linear probe" slot after the last data structure entry in the secondary table is guaranteed to be empty. As such, as observed in FIG. 2, the next linear probe slot after the fourth data structure entry (i.e., the (AS1+2$\Delta A$)+$\Delta A$=AS1+3$\Delta A$) slot will not have a substantive entry in it (e.g., some kind of "null value" resides there).

In an embodiment, in order to guarantee the existence of an empty space at the end of a chain as described just above, the initial size of the secondary table (i.e., the number of slots in the secondary table) is made to be a prime number as is the linear probing offset $\Delta A$. For example, in a further embodiment, the initial size of the secondary table is set equal to $2^p-1$ where p=5, 7, 11, 17, or 19 (i.e., different secondary table initial sizes are possible with p=5 corresponding to the smallest secondary table size and p=19 corresponding to the largest secondary table size); and, the linear probing offset $\Delta A$ is equal to 7. Setting the probing offset equal to 7 allows for enhanced efficiency if the hash table structure will tend to store values that are divisible by 8 or 16. Techniques also exist for growing the size of the secondary table from its initial size if it overflows. These are discussed in more detail further ahead with respect to FIG. 8.

Figure 4:
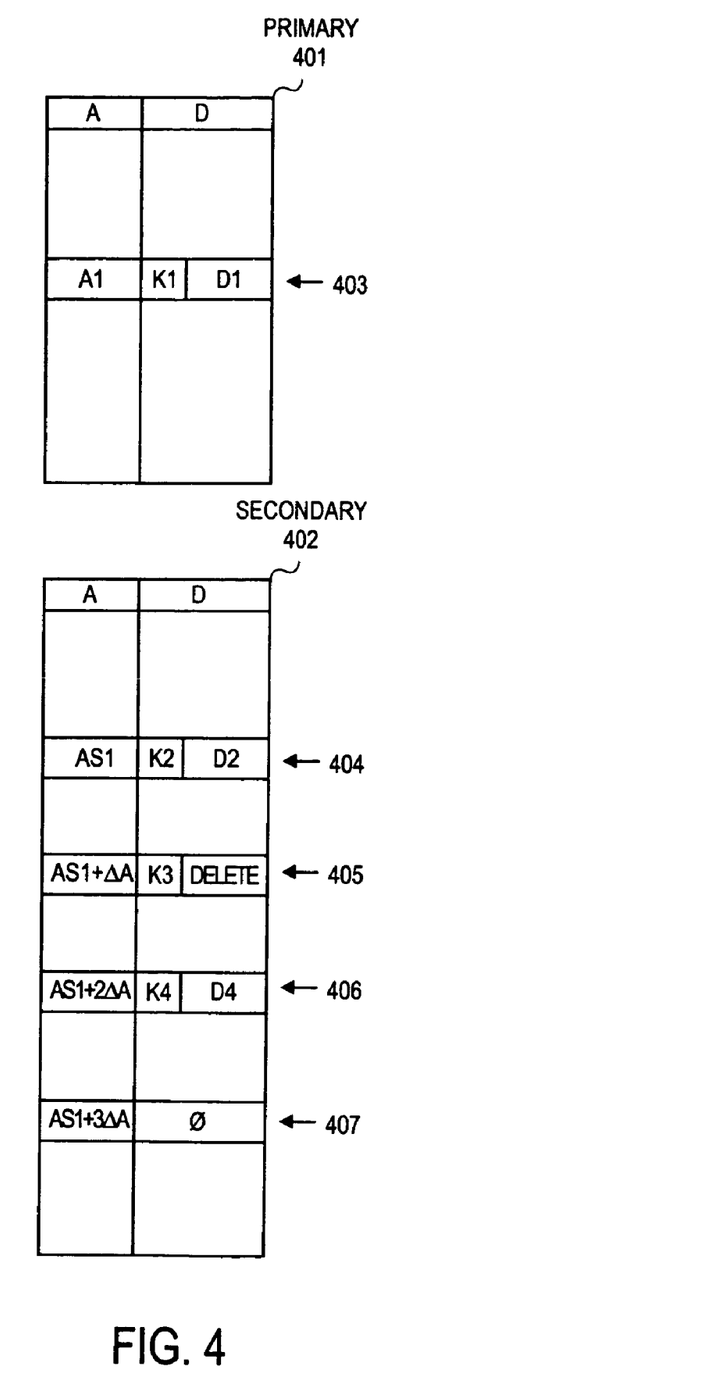
FIG. 4 shows the hash map of FIG. 2 with an entry marked as deleted.
Figure 5A:
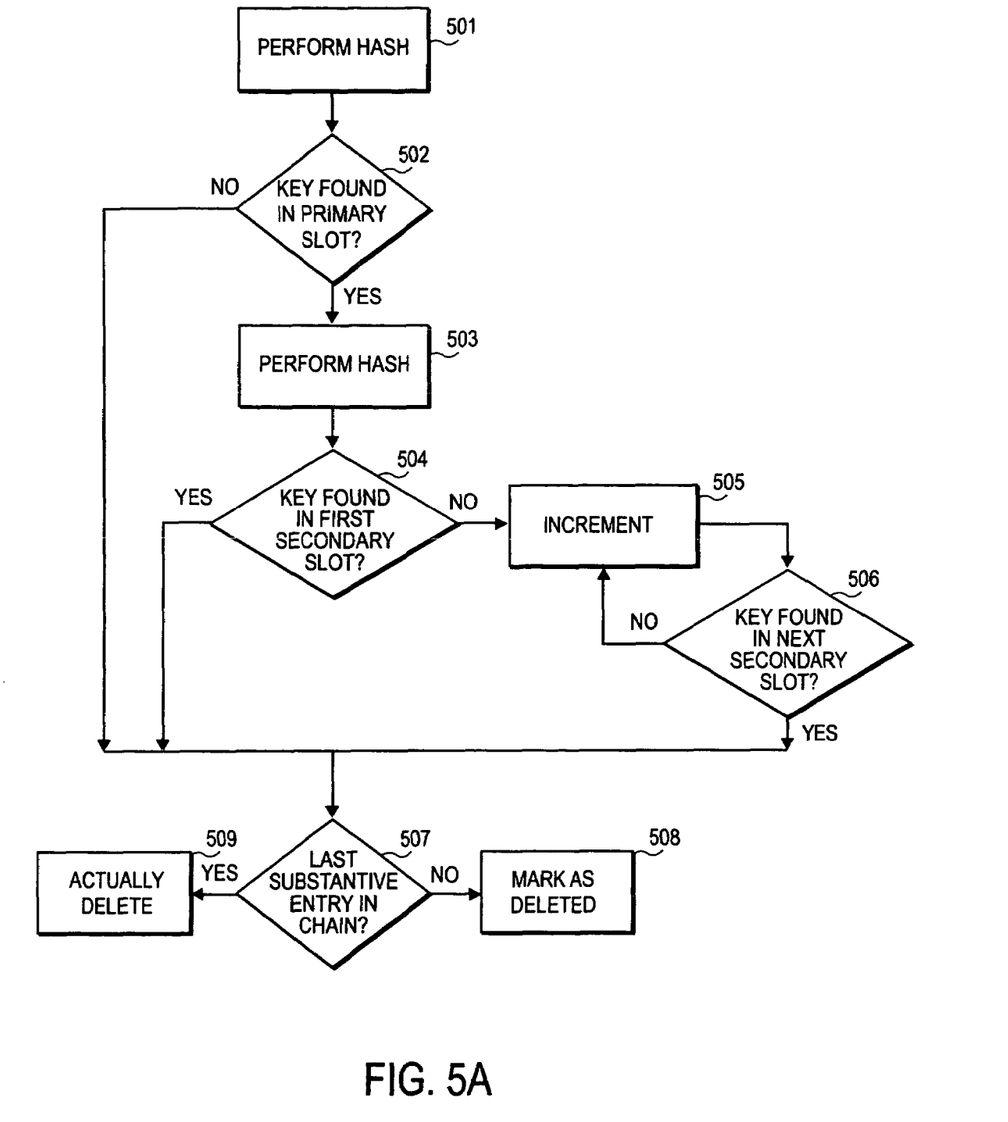
FIG. 5a shows a deletion process for the hash map population of FIG. 2 that produces the hash map population of FIG. 4.

With a basic insertion process being described, a deletion process is next described with respect to FIG. 4 and 5a. The deletion process of FIG. 5a marks "not last" chain entries to be deleted rather than actually deleting them from the hash table. As such, FIG. 5b will present a more sophisticated insertion process than that just described above with respect to FIG. 3 that accounts for the deletion marking associated with the deletion process of FIG. 5a.

According to the deletion process of FIG. 5a, if a data structure in a chain of stored data structures that map to the same hash value is to be deleted, and if the data structure is not the last data structure in the chain, the data structure is not deleted. Rather, the data structure is simply marked as being "deleted". Referring to FIGS. 4 and 5, FIG. 4 shows the result of an attempt to delete the third data structure having the K3 key from the hash table state observed in FIG. 2.

According to the process of FIG. 4a, a hashing function is first performed 501 to produce a primary table 401 address value A1. Because of the prior insertion of the first data structure into the A1 slot 403 of the primary table, the key K1 found in the A1 slot of the primary table will not match the key K3 being searched for (i.e., the answer to inquiry 502 is "no"). A second hash function is performed 503 on the K3 key to identify the first slot AS1 in the secondary table 401 that the K3 key maps to. Because of the prior insertion of the second data structure into the AS1 slot 404 of the secondary table 402, the key K2 found in the AS1 slot of the primary table will not match the key K3 being searched for (i.e., the answer to inquiry 504 is "no").

As such, again consistent with a linear probing scheme, the AS1 value is summed 505 with a fixed value $\Delta A$ to identify the next secondary slot AS1+$\Delta A$ within the secondary table 402. At the AS1+$\Delta A$ slot 405, the key K3 found in the AS1+$\Delta A$ slot will match the K3 key being searched for (i.e., the answer to inquiry 506 will be "yes"). Because of the matching K3 keys, a check 507 is made to see if the AS1+ΔA slot corresponds to last substantive entry in the chain of substantive entries. The check is made simply by summing to the AS1+ΔA value with the offset ΔA to the next linear probe value AS1+2ΔA and seeing if the entry at the next linear probe slot 406 is empty or not. According to the example being described, the AS1+2ΔA entry 406 is non-empty, therefore the data entry D3 in the third data structure will be marked as "deleted" 508 rather than actually deleted 509.

As an example, if an attempt was made to delete the fourth data structure residing at the AS1+2ΔA slot, the check 507 into the next AS1+3ΔA secondary table slot would recognize that the slot is empty. As such, the fourth data structure would be actually deleted 509 from the table resulting in an empty slot at the location AS1+3ΔA. Because the deletion, insertion and access algorithms identify the end of a collision chain by the presence of the empty secondary slot, deleting the fourth data structure as just described would essentially shorten the maximum search length for a key for subsequent deletions, insertions and accesses.

According to a further implementation, if a "chain" of entries marked as deleted run to the empty slot, the entire chain of entries marked as deleted will be actually deleted. For example, if after the hash map state observed in FIG. 4 an attempt is made to delete the second data structure, the AS1 slot 404 will be marked as deleted (because slot 405 is marked as deleted and is therefore not an empty space). With slots 404 and 405 being marked as deleted, if an attempt is next made to delete the fourth data structure, all three slots 404, 405 and 406 will be actually deleted (i.e., the secondary table 202 will be completely empty for this chain), because the deletion at slot 406 would cause a chain of deletions over slots 404, 405 and 406 that run to the empty slot 407. Note also that key matches at the primary slot 502 and the first secondary slot 504 also cause actual deletion or deletion marking.

Figure 5B:
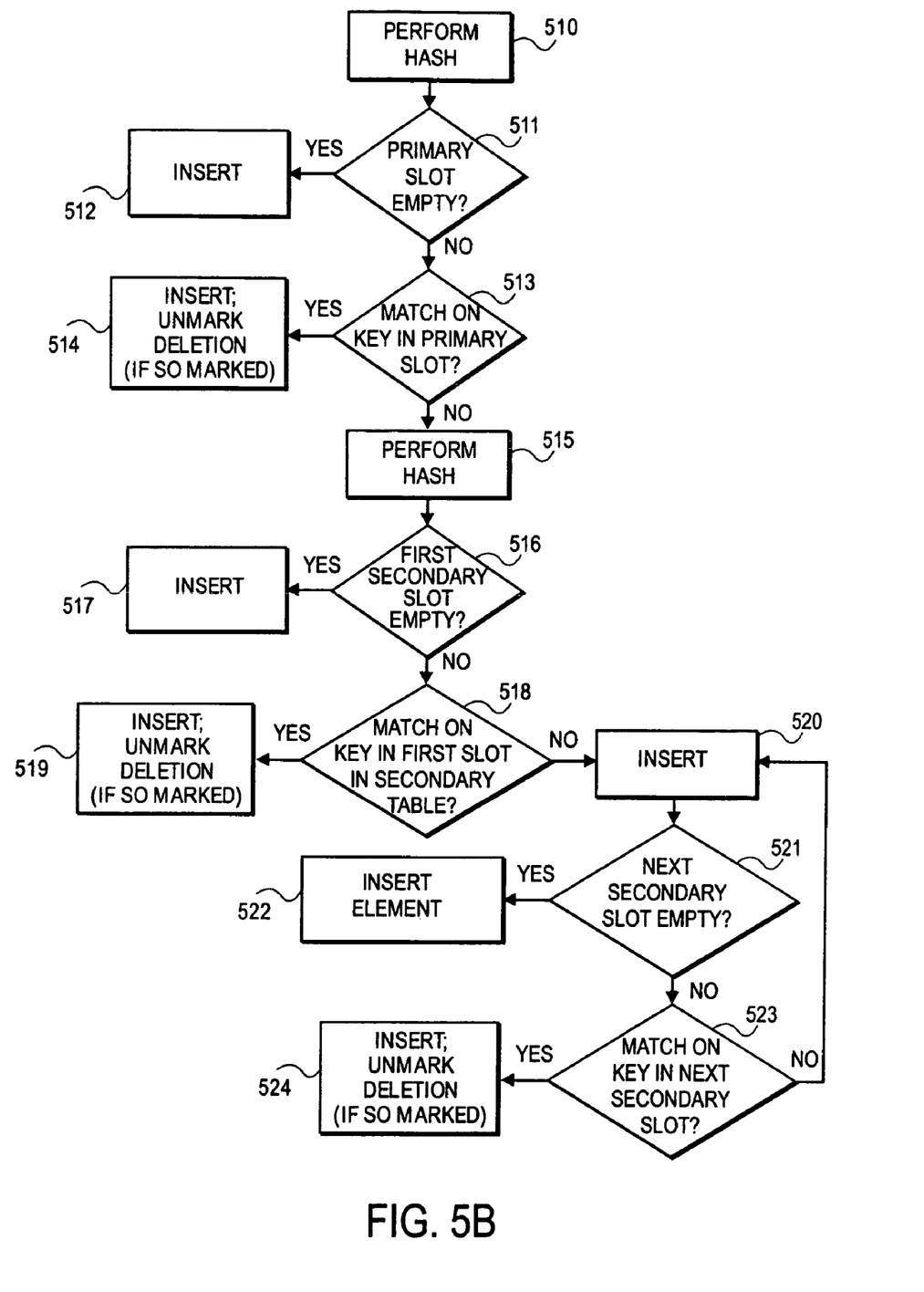
FIG. 5b shows an insertion process for a hash map having a secondary table with linear probing that respects a deletion mark.

FIG. 5b shows an insertion process, which can be used to write new data structures or update existing ones, that contemplates the possible presence of primary or secondary table slot entries that are marked as deleted. As an example, it will be assumed that the hash map state is that observed in FIG. 4 and that an attempt is made to "re-insert" the just deleted third data structure having a K3 key value.

According to the process of FIG. 5b, a hashing function is first performed 510 to produce a primary table 401 address value A1. Because of the presence of the first data structure into the A1 slot 403 of the primary table, the A1 slot is not empty and the key K1 found in the A1 slot of the primary table will not match the key K3 being searched for (i.e., the answer to both of inquiries 511, 513 is "no"). A second hash function is therefore performed 515 on the K3 key to identify the first slot AS1 in the secondary table 402 that the K3 key maps to. Because of the presence of the second data structure into the AS1 slot 404 of the secondary table 402, the AS1 slot 404 of the primary table is not empty and the key K2 found in the AS1 slot will not match the key K3 being searched for (i.e., the answer to inquiries 516, 518 is "no").

As such, again consistent with a linear probing scheme, the AS1 value is summed 520 with a fixed value ΔA to identify the next secondary slot AS1+ΔA within the secondary table 402. Because of the presence of the third data structure at the AS1+ΔA slot 405, slot 405 is non empty and the key K3 found in the AS1+ΔA slot will match the K3 key being searched for (i.e., the answer to inquiry 521 will be "no" and the answer to inquiry 523 will be "yes"). Because of the matching K3 keys, the deletion mark that appears at slot 405 will be removed and the third data structure will be re-inserted 524.

Because a key match during an insertion process may find an entry that is not marked deleted (i.e., the insertion may correspond to a simple write operation), or may find an entry that is marked for deletion (i.e., the insertion corresponds to a re-insertion of a previous deleted data structure), each of the insertion processes 514, 519, 524 also indicate that the deletion mark should be removed if one exists. Because insertion processes 512, 517, 522 that trigger off of the discovery of an empty space 511, 516, 521 (which marks the end of a collision chain) by definition cannot find a deletion mark at the empty space, no such process for removing a deletion mark exists.

Figure 6A:
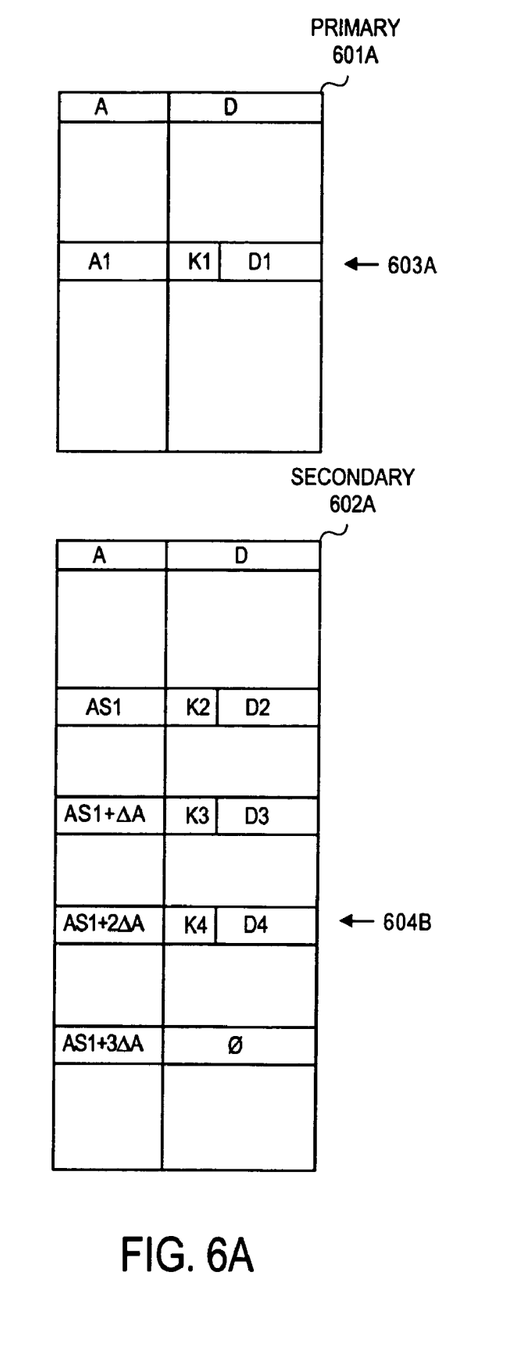
FIGS. 6a and 6b show a hash table having a secondary table with linear probing where respective slots are flipped.
Figure 6B:
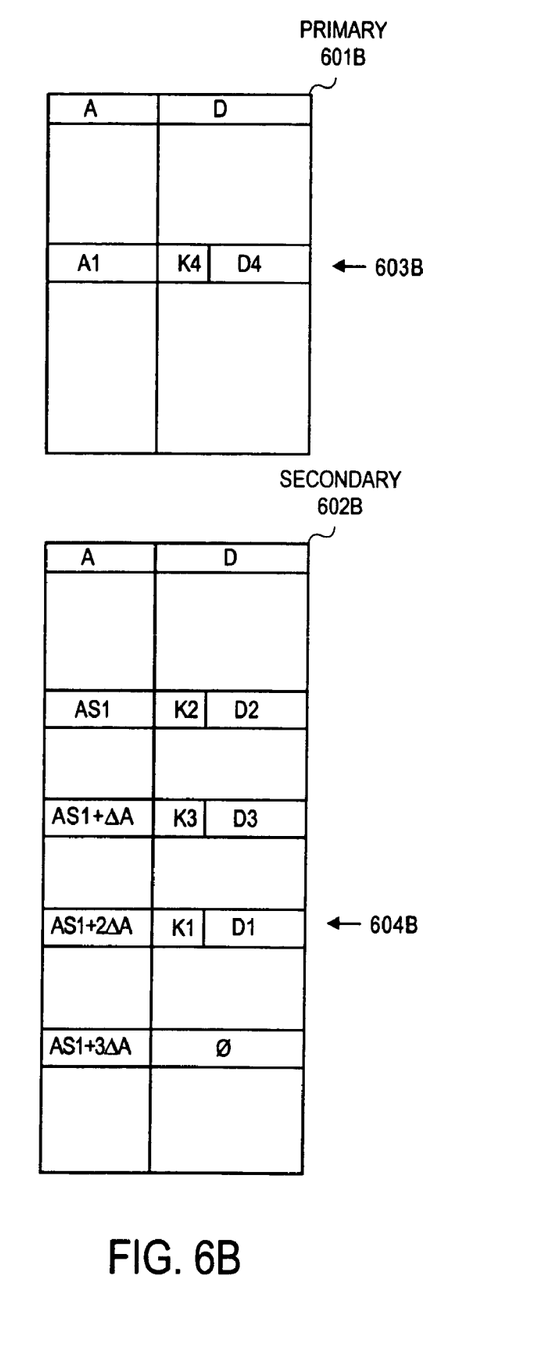
Figure 7:
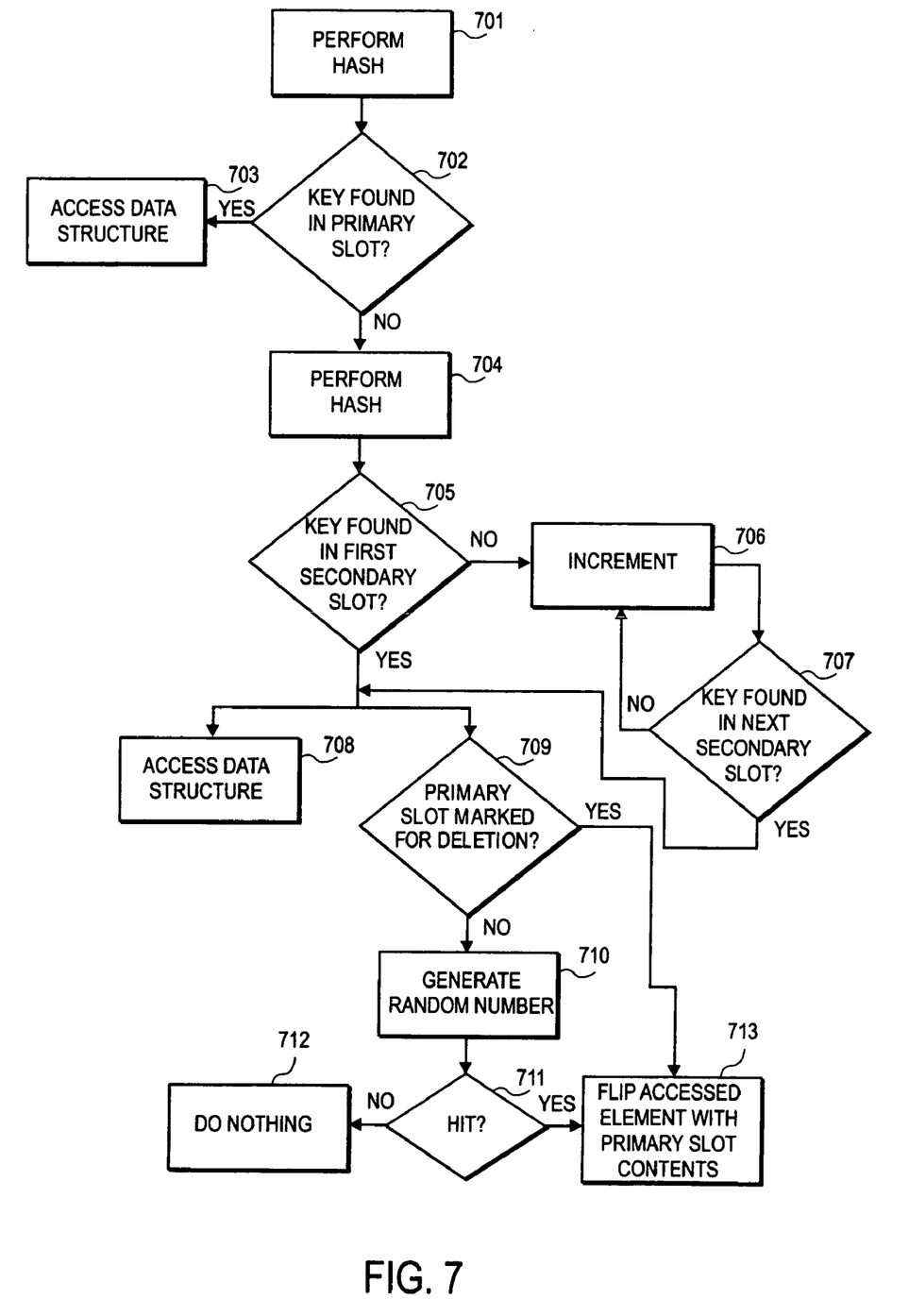
FIG. 7 shows a process that can flip an accessed slot in the secondary table with a slot in the primary table.

Recall from the background that accesses to a primary table should take less time than accesses to a secondary table. FIGS. 6a,b and 7 demonstrate an access process (e.g., for reading) that effectively builds "a cache within a cache" in the sense that a collision chain's more heavily utilized data structure(s) will "bubble up" into the primary table. By bubbling up a more heavily accessed data structure into the primary table, efficient operation will result because frequent deep searches into the end of a chain (e.g., that contemplates a second hash into the secondary table plus multiple linear probing summations) in accessing a deeply located and frequently used data structure will be avoided.

FIG. 6a shows an initial hash map state that conforms to the hash map state originally observed in FIG. 2. According to the process of FIG. 7, it is assumed that an attempt to access the fourth data structure having the K4 key is attempted. A hash is initially performed 701 on the K4 key which maps to the A1 table location 603a of the primary table 601a. Because of the presence of the first data structure in the A1 table location 603a, the K1 key found at table location 603 will not match the K4 key being searched for (i.e., the answer to inquiry 702 will be "no"). As such, a second hash is performed 704 to locate the first slot AS1 in the secondary table 602a that the K3 key value maps to.

Because of the presence of the second data structure in the AS1 table location, the K2 key found at the AS1 table location will not match the K4 key being searched for (i.e., the answer to inquiry 705 will be "no"). As such, again consistent with a linear probing scheme, the AS1 value is summed 706 with a fixed value ΔA to identify the next secondary slot AS1+ΔA within the secondary table 602b. Because of the presence of the third data structure at the AS1+ΔA slot, the K3 key found at the AS1+ΔA slot will not match the K4 key value being searched for (i.e., the answer to inquiry 707 will be "no"). As such, the AS1+ΔA value is summed 706 with the fixed value ΔA to identify the next secondary slot AS1+2ΔA within the secondary table 602b (i.e., slot 604a).

Because of the presence of the fourth data structure at slot 604a, the K4 key found at slot 604a will match the K4 key value being searched for (i.e., the answer to inquiry 707 will be "yes"), access will be made to the data D4 of slot 604a (e.g., to perform a cache read), and, a result will be randomly generated (e.g., a number will be generated through a random number generation process 710). If the result is a "looked for" result, a "hit" results. For example, if a random number generator generates any integer from 1.0 to 10.0 inclusive and the number 1.0 is the "looked for" number; and, if the number 1.0 actually results from the number generation process, then, a "hit" results.

If the result is a "hit" the accessed data structure at the secondary table slot 604a is "flipped" 713 with the primary table slot entry 603a. FIG. 6b shows the results of a hit and subsequent flip 713 after the K4 key match is found at slot location 604a. From FIG. 6b, the fourth data structure is now observed in the primary table slot 603b for the collision chain; and, the first data structure is now observed in the slot location

604b where the fourth data structure was originally found. If the result from the random process was not a hit, the fourth data structure would have remained in slot 604a (i.e., no flip would have taken place).

The flip of slot entries based on a hit from a random event will cause more frequently used entries to reside in the primary table slot more often than less frequently used entries. For example, if the fourth data structure is very heavily accessed and the looked for value is 1.0 from a random generator that produces any integer between 1.0 and 10.0 inclusive, each access to the fourth data structure would have only a 10% of being flipped with the entry in the primary slot. However, an expectation of a flip would result by the tenth access to the fourth data structure. Because of the heavy usage of the fourth data structure, there is an expectation it would eventually reach the primary table slot.

Moreover, the percentage of total time that the data structure would spend in the primary slot is apt to be a result of the relative usages of collision chain siblings. For example, if the fourth data structure received significantly more accesses than all its other collision chain siblings, the fourth data structure could expect to spend disproportionate amount of time in the primary table slot. As another example, if the fourth and first data structures both received significantly more accesses than their collision chain siblings, the fourth and first data structures could expect to spend disproportionate amounts of time in the primary table slot relative to their collision chain siblings. The amount of time the fourth and first data structures spend in the primary table slot relative to each other would be a result of the frequency of their accesses relative to one another. For example, if they had approximately equal usages they would expect to split the amount of time that their collision siblings were not in the primary table slot.

Note from FIG. 7 that a flip can be automatic (i.e., the random event process is not performed and the flip must take place) if the primary slot is populated with an entry marked for deletion 709.

Referring back to FIG. 5b, the random event generation and possible flipping activity discussed above could also be performed with each insertion (e.g., with each cache write) made into the secondary table. As such, the amount of time a particular data structure would spend within the primary table slot would be a function of both the reads and writes that are made to the data structure.

Figure 8:
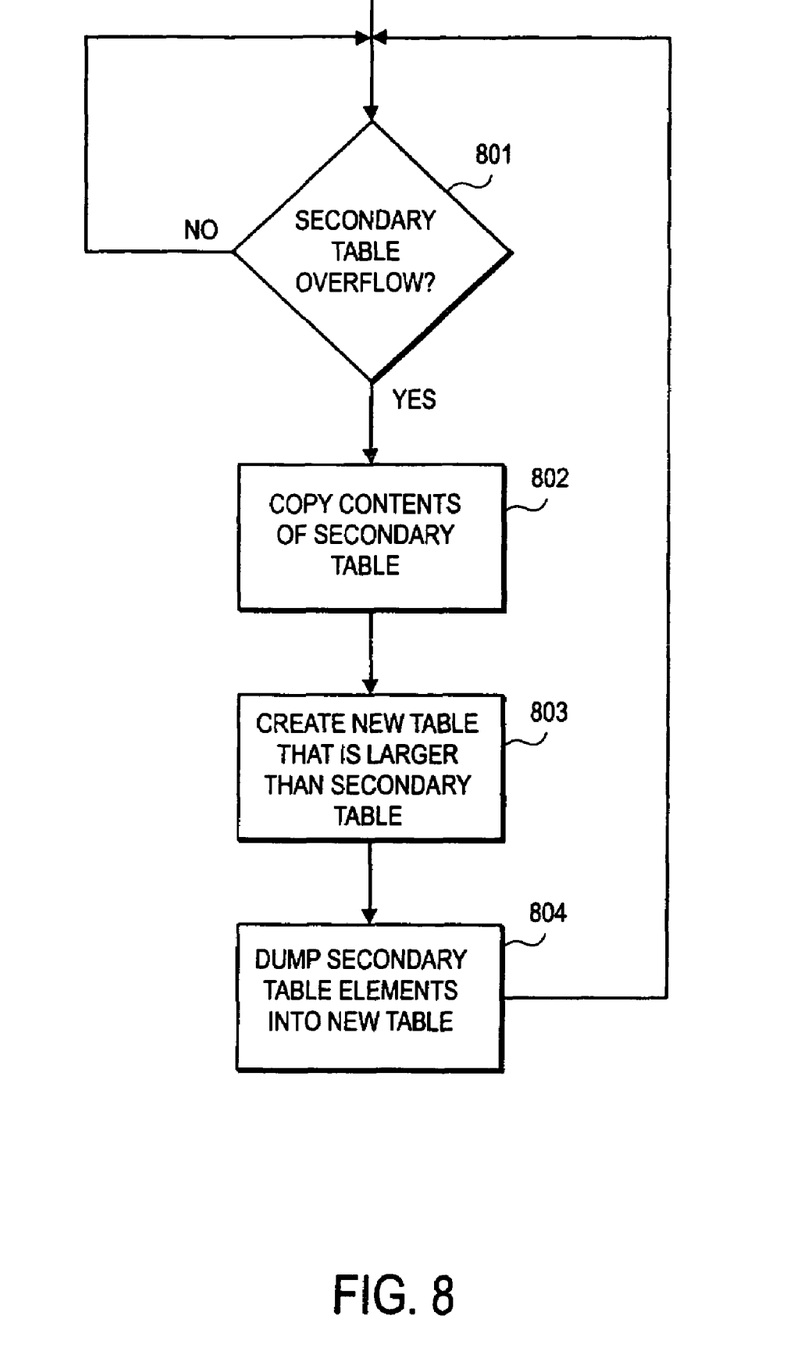
FIG. 8 shows a process for increasing the size of the secondary table.

FIG. 8 shows a process for increasing the size of the secondary table of it happens to overflow. According to the process of FIG. 8, if the secondary table overflows 801, the contents of the presently used secondary table are copied 802 and a separate new table (e.g., in some different section of a computing system's system memory used to implement the cache) is created 803. The contents copied from the "old" secondary table are then dumped 804 into the new a larger table which is subsequently used as the new larger secondary table.

In an embodiment, the amount by which the secondary table is increased is its "initial size". For example, from the discussion concerning FIG. 3 provided above, recall that the initial size of the secondary table can be $2^p-1$ where p=5, 7, 11, 17, or 19. Each time the secondary table overflows, it is increased (e.g., according to the process referred to just above with respect to FIG. 8) by its initial size.

Thus, for example, if the initial size of the secondary table is set to 31 (which corresponds to a p value of 5), upon its overflow, the secondary table is resized to 62 (which corresponds to its "previous size" plus its "initial size"). If the secondary table again overflows, the secondary table is again resized by effectively increasing its size by the initial size. This corresponds to adding the initial size (31) to the secondary table's previous size (62) which results in a new secondary table size of 93.

In a further embodiment, an "overflow" condition is not "every slot in the secondary table is filled". Here, because key chains are supposed to end with an empty slot, by definition, empty slots are supposed to be existing within the secondary table at the moment it is deemed to be overflowing sufficiently to trigger a resize to a new, larger size. Specifically, according to one embodiment, the increasing of the secondary table size to a next larger size is triggered if either of the following two conditions arise: 1) the number of separate linear probe chains being supported in the secondary table is less than the hash number size; 2) the number of slots in the secondary table is less than ¾ that of the hash number size. By triggering a resize on the occurrence of either of these events, an empty space can be guaranteed at the end of each linear probe chain.

Processes taught by the discussion above may be performed with program code such as machine-executable instructions which cause a machine (such as a "virtual machine", a general-purpose processor disposed on a semiconductor chip or special-purpose processor disposed on a semiconductor chip) to perform certain functions. Alternatively, these functions may be performed by specific hardware components that contain hardwired logic for performing the functions, or by any combination of programmed computer components and custom hardware components.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 9:
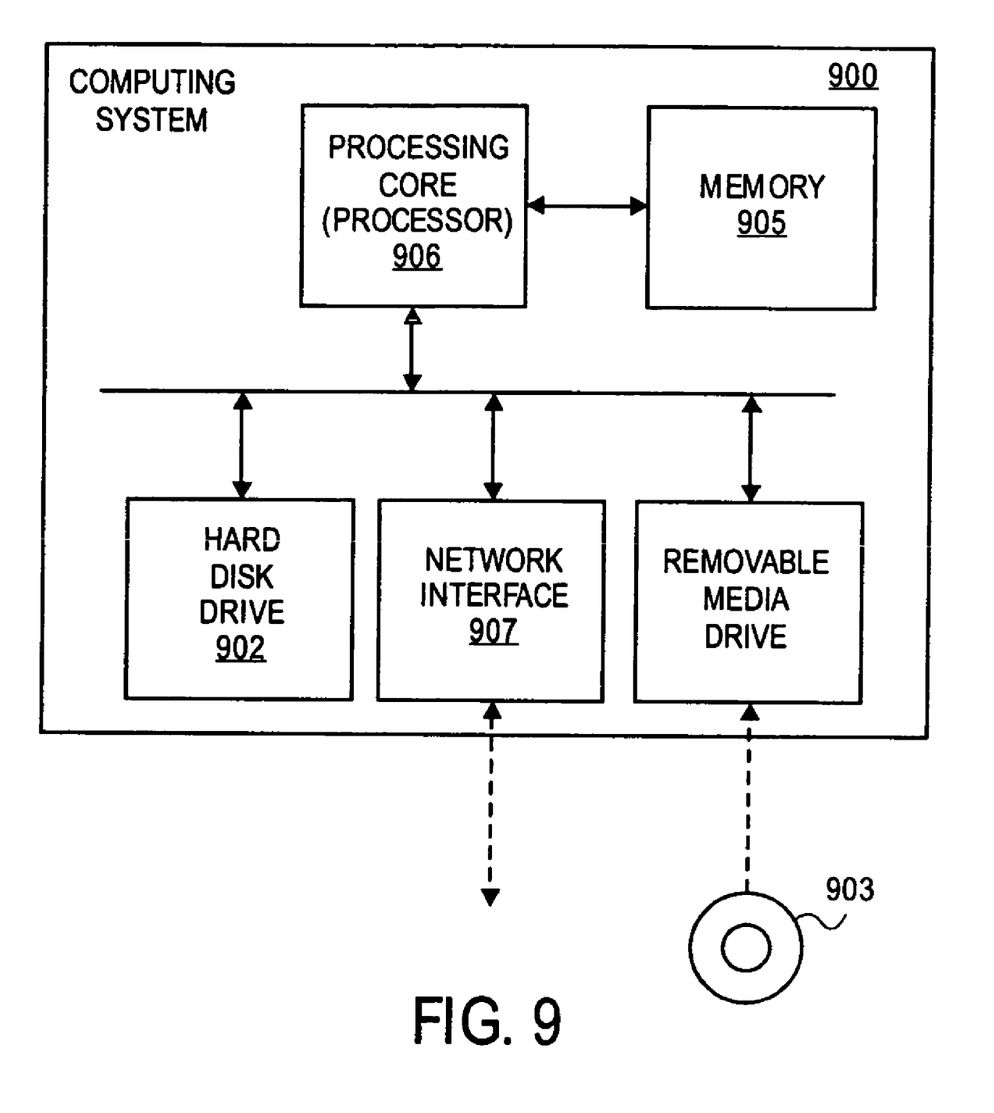
FIG. 9 shows an embodiment of a computing system.

FIG. 9 is a block diagram of a computing system 900 that can execute program code stored by an article of manufacture. It is important to recognize that the computing system block diagram of FIG. 9 is just one of various computing system architectures. The applicable article of manufacture may include one or more fixed components (such as a hard disk drive 902 or memory 905) and/or various movable components such as a CD ROM 903, a compact disc, a magnetic tape, etc. In order to execute the program code, typically instructions of the program code are loaded into the Random Access Memory (RAM) 905; and, the processing core 906 then executes the instructions. The processing core may include one or more processors and a memory controller function. A virtual machine or "interpreter" (e.g., a Java Virtual Machine) may run on top of the processing core (architecturally speaking) in order to convert abstract code (e.g., Java bytecode) into instructions that are understandable to the specific processor(s) of the processing core 906.

It is believed that processes taught by the discussion above can be practiced within various software environments such as, for example, object-oriented and non-object-oriented programming environments, Java based environments (such as a Java 2 Enterprise Edition (J2EE) environment or environments defined by other releases of the Java standard), or other environments (e.g., a NET environment, a Windows/NT environment each provided by Microsoft Corporation).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A method, comprising:
   within a computing system, executing program code stored in memory with one or more processors to perform the following method:
   fetching a computer readable cached data structure by:
      hashing a key value to locate a slot in a primary table, said key value associated with said cached data structure, a first storage location being associated with said slot in said primary table;
      in response to said key value not being located in said slot of said primary table, hashing said key value to locate another slot in a secondary table;
      in response to said key value not being located in said another slot of said secondary table, linearly probing said secondary table starting from said another slot until a slot is found in said secondary table having said key value, said linear probing including repeatedly calculating a new address value by adding a same fixed value to a previous address value;
      reading said computer readable data structure from a second storage location associated with said slot in said secondary table where said key value was found;
      generating a random value in response to said key value being found in said secondary table, and, in response to said random value being a looked for value: moving another computer readable data structure found in said first storage location to said second storage location, and, moving said computer readable data structure from said second storage location to said first storage location; and,
      providing said computer readable data structure.

2. The method of claim 1 wherein said method further comprises caching a second computer readable data structure by:
   hashing a second key value to locate a second slot in said primary table, said second key value associated with said second computer readable data structure;
   in response to said second key value not being stored in said second slot of said primary table, hashing said second key value to locate a second other slot in said secondary table;
   in response to said second key value not being stored in said second other slot, linearly probing said secondary table starting from said second other slot until an empty slot is found in said secondary table; and,
   inserting said second computer readable data structure into a storage location associated with said empty slot.

3. The method of claim 2 further comprising:
   hashing a third key value to locate a third slot in said primary table, said third key value associated with a third computer readable data structure;
   in response to said third key value not being stored in said third slot of said primary table, hashing said third key value to locate a third other slot in said secondary table;
   in response to said third key value not being stored in said third other slot, linearly probing said secondary table starting from said third other slot until a slot is found in said secondary table having said third key value; and,
   marking in said slot of said secondary table where said third key value was found that said third computer readable data structure has a status of deleted, said third computer readable data structure stored in a third storage location associated with said slot in said secondary table where said third key value was found.

4. The method of claim 3 wherein said method further comprises, in response to said secondary table overflowing, placing said secondary table's contents into a larger table and then using said larger table as said primary table's secondary table.

5. The method of claim 4 wherein said method further comprises, in response to said larger secondary table overflowing, placing said larger secondary table's contents into a second larger table and then using said second larger table as said primary table's secondary table, said second larger table being larger than said larger table.

6. The method of claim 5 wherein the difference between the size of the secondary table and the size of the larger table is the same as the difference between the size of the larger table and the second larger table.

7. The method of claim 6 wherein the difference is a function of $2^P-1$ where p=5, 7, 11, 17 or 19.

8. The method of claim 4 wherein said secondary table and larger table are implemented within a system memory of a computer.

9. A machine readable storage medium containing program code that when processed by one or more processors of a computer causes the following method to be performed:
   fetching a computer readable cached data structure by:
      fetching a computer readable cached data structure by:
         hashing a key value to locate a slot in a primary table, said key value associated with said cached data structure, a first storage location being associated with said slot in said primary table;
         in response to said key value not being located in said slot of said primary table, hashing said key value to locate another slot in a secondary table;
         in response to said key value not being located in said another slot of said secondary table, linearly probing said secondary table starting from said another slot until a slot is found in said secondary table having said key value, said linear probing including repeatedly calculating a new address value by adding a same fixed value to a previous address value;
         reading said computer readable data structure from a second storage location associated with said slot in said secondary table where said key value was found;
         generating a random value in response to said key value being found in said secondary table, and, in response to said random value being a looked for value: moving another computer readable data structure found in said first storage location to said second storage location, and, moving said computer readable data structure from said second storage location to said first storage location; and,
         providing said computer readable data structure.

10. The machine readable storage medium of claim 9 wherein said method further comprises caching a second computer readable data structure by:
   hashing a second key value to locate a second slot in said primary table, said second key value associated with said second computer readable data structure;
   in response to said second key value not being stored in said second slot of said primary table, hashing said second key value to locate a second other slot in said secondary table;

in response to said second key value not being stored in said second other slot, linearly probing said secondary table starting from said second other slot until an empty slot is found in said secondary table; and, inserting said second computer readable data structure into a storage location associated with said empty slot.

11. The machine readable storage medium of claim 10 further comprising:

hashing a third key value to locate a third slot in said primary table, said third key value associated with a third computer readable data structure;

in response to said third key value not being stored in said third slot of said primary table, hashing said third key value to locate a third other slot in said secondary table;

in response to said third key value not being stored in said third other slot, linearly probing said secondary table starting from said third other slot until a slot is found in said secondary table having said third key value; and, marking in said slot of said secondary table where said third key value was found that said third computer readable data structure has a status of deleted, said third computer readable data structure stored in a third storage location associated with said slot in said secondary table where said third key value was found.

12. The machine readable storage medium of claim 11 wherein said method further comprises, in response to said secondary table overflowing, placing said secondary table's contents into a larger table and then using said larger table as said primary table's secondary table.

13. The machine readable storage medium of claim 12 wherein said method further comprises, in response to said larger secondary table overflowing, placing said larger secondary table's contents into a second larger table and then using said second larger table as said primary table's secondary table, said second larger table being larger than said larger table.

14. The machine readable storage medium of claim 13 wherein the difference between the size of the secondary table and the size of the larger table is the same as the difference between the size of the larger table and the second larger table.

15. The machine readable storage medium of claim 14 wherein the difference is a function of $2^P-1$ where p=5, 7, 11, 17 or 19.

16. The machine readable storage medium of claim 12 wherein said secondary table and larger table are implemented within a system memory of a computer.

17. A computer system comprising one or more processors and a machine readable storage medium containing program code that when processed by said one or more processors causes the following method to be performed:

fetching a computer readable cached data structure by:

hashing a key value to locate a slot in a primary table, said key value associated with said cached data structure, a first storage location being associated with said slot in said primary table;

in response to said key value not being located in said slot of said primary table, hashing said key value to locate another slot in a secondary table;

in response to said key value not being located in said another slot of said secondary table, linearly probing said secondary table starting from said another slot until a slot is found in said secondary table having said key value, said linear probing including repeatedly calculating a new address value by adding a same fixed value to a previous address value;

reading said computer readable data structure from a second storage location associated with said slot in said secondary table where said key value was found;

generating a random value in response to said key value being found in said secondary table, and, in response to said random value being a looked for value: moving another computer readable data structure found in said first storage location to said second storage location, and, moving said computer readable data structure from said second storage location to said first storage location; and, providing said computer readable data structure.

18. The computer system of claim 17 wherein said method further comprises caching a second computer readable data structure by:

hashing a second key value to locate a second slot in said primary table, said second key value associated with said second computer readable data structure;

in response to said second key value not being stored in said second slot of said primary table, hashing said second key value to locate a second other slot in said secondary table;

in response to said second key value not being stored in said second other slot, linearly probing said secondary table starting from said second other slot until an empty slot is found in said secondary table; and, inserting said second computer readable data structure into a storage location associated with said empty slot.

19. The computer system of claim 18 further comprising:

hashing a third key value to locate a third slot in said primary table, said third key value associated with a third computer readable data structure;

in response to said third key value not being stored in said third slot of said primary table, hashing said third key value to locate a third other slot in said secondary table;

in response to said third key value not being stored in said third other slot, linearly probing said secondary table starting from said third other slot until a slot is found in said secondary table having said third key value; and, marking in said slot of said secondary table where said third key value was found that said third computer readable data structure has a status of deleted, said third computer readable data structure stored in a third storage location associated with said slot in said secondary table where said third key value was found.

20. The computer system of claim 19 wherein said method further comprises, in response to said secondary table overflowing, placing said secondary table's contents into a larger table and then using said larger table as said primary table's secondary table.

21. The computer system of claim 20 wherein said method further comprises, in response to said larger secondary table overflowing, placing said larger secondary table's contents into a second larger table and then using said second larger table as said primary table's secondary table, said second larger table being larger than said larger table.

22. The computer system of claim 21 wherein the difference between the size of the secondary table and the size of the larger table is the same as the difference between the size of the larger table and the second larger table.

23. The computer system of claim 22 wherein the difference is a function of $2^P-1$ where p=5, 7, 11, 17 or 19.

24. The computer system of claim 20 wherein said secondary table and larger table are implemented within a system memory of a computer.

* * * * *